United States Patent [19]

Shimizu et al.

[11] Patent Number: 5,021,904
[45] Date of Patent: Jun. 4, 1991

[54] TAPE CASSETTE PUSH-OUT DEVICE FOR TAPE RECORDER

[75] Inventors: Akira Shimizu; Atsushi Kurosawa; Fumiya Yamada, all of Kawagoe, Japan

[73] Assignee: Pioneer Electronic Corporation, Tokyo, Japan

[21] Appl. No.: 331,210

[22] Filed: Mar. 31, 1989

[30] Foreign Application Priority Data

Jun. 23, 1988 [JP] Japan .................. 63-153492

[51] Int. Cl.⁵ ........................................ G11B 15/675
[52] U.S. Cl. ................................................. 360/96.5
[58] Field of Search ................. 360/96.5, 96.6, 99.02, 360/99.03, 99.06, 99.07; 242/198, 199

[56] References Cited

U.S. PATENT DOCUMENTS 4,688,122  8/1987  Takai et al. .................. 360/96.5

FOREIGN PATENT DOCUMENTS 1428166  3/1976  United Kingdom .
1493417  11/1977 United Kingdom .
1520999  8/1978  United Kingdom .
1542882  3/1979  United Kingdom .
2045996  11/1980 United Kingdom .
2072922  10/1981 United Kingdom .

Primary Examiner—David J. Severin
Attorney, Agent, or Firm—Sughrue, Mion, Zinn, Macpeak & Seas

[57] ABSTRACT

A tape cassette push-out device for a tape recorder includes a push-out mechanism for pushing the rear face of a tape cassette (A) thereby moving the cassette to a cassette insertion opening (2) of the recorder. Before the push-out mechanism is operated, a cassette box (7) for holding the cassette is first moved from a tape driving position to a position adjacent to the backside of the cassette insertion opening. After operation of the push-out mechanism, the mechanism is retractable away from the cassette.

5 Claims, 12 Drawing Sheets

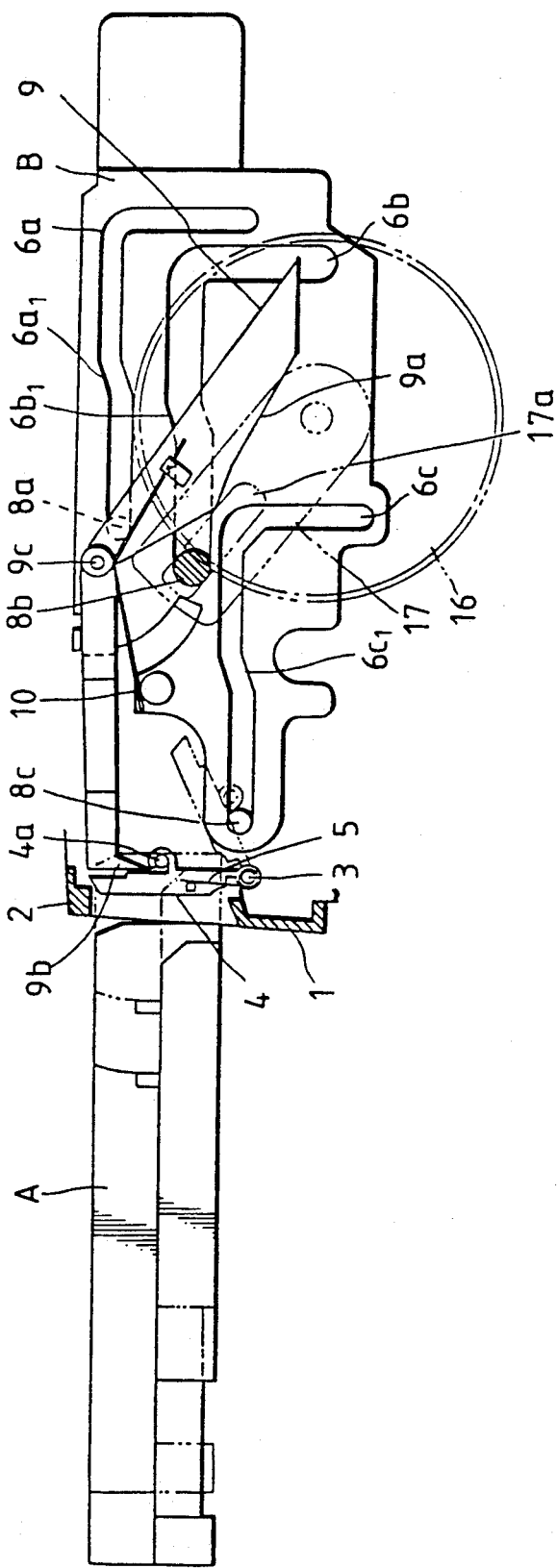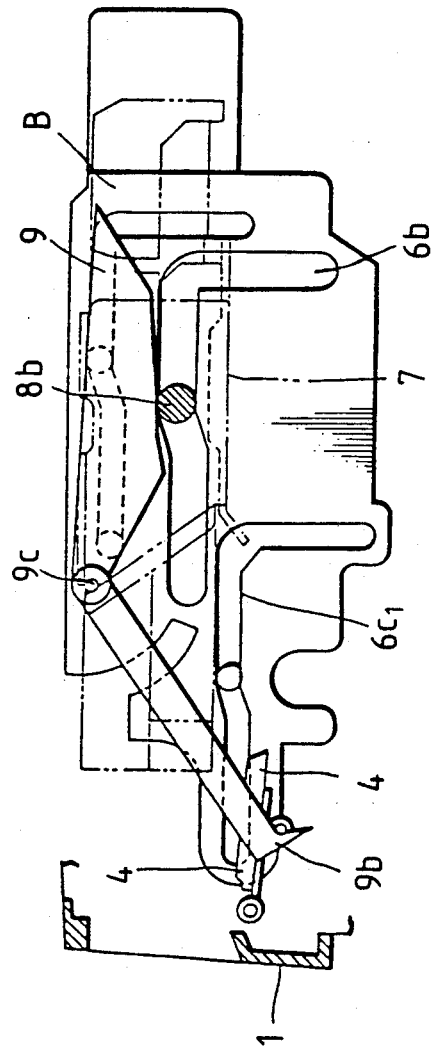

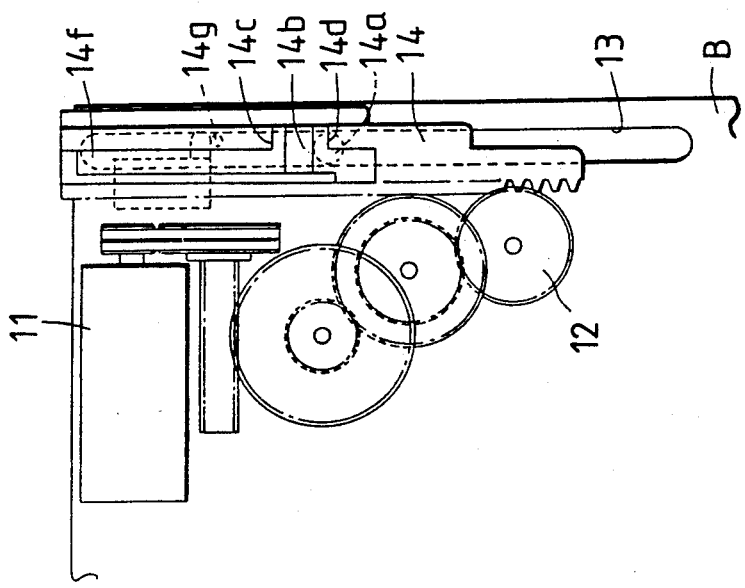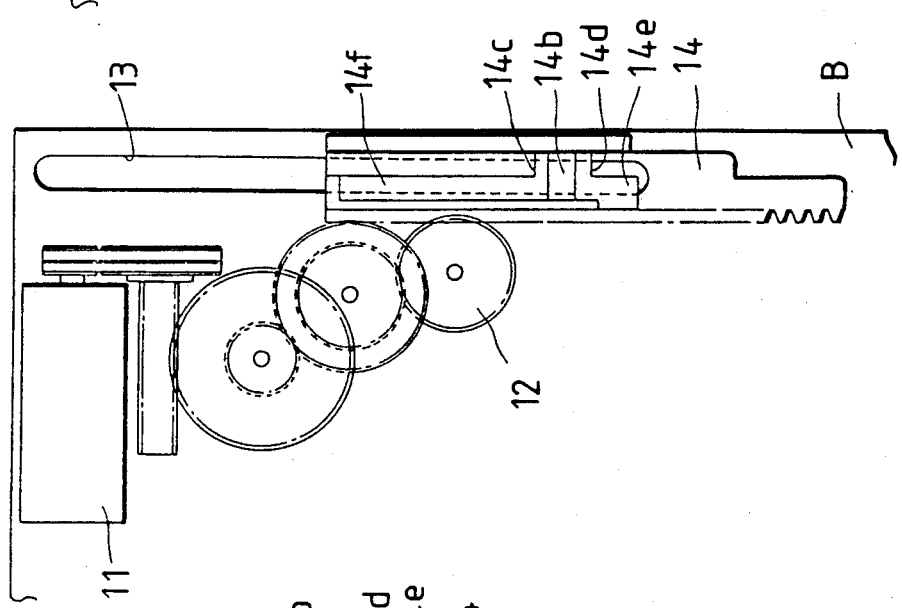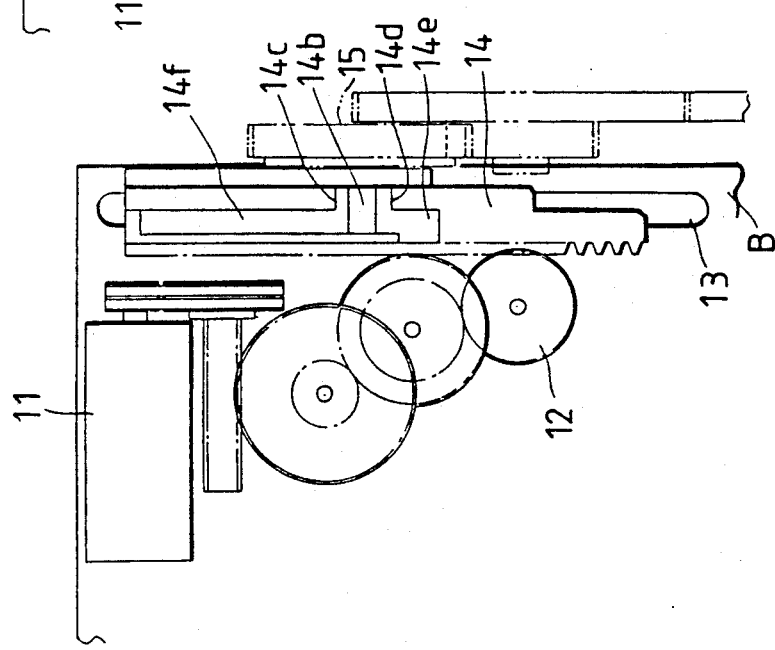

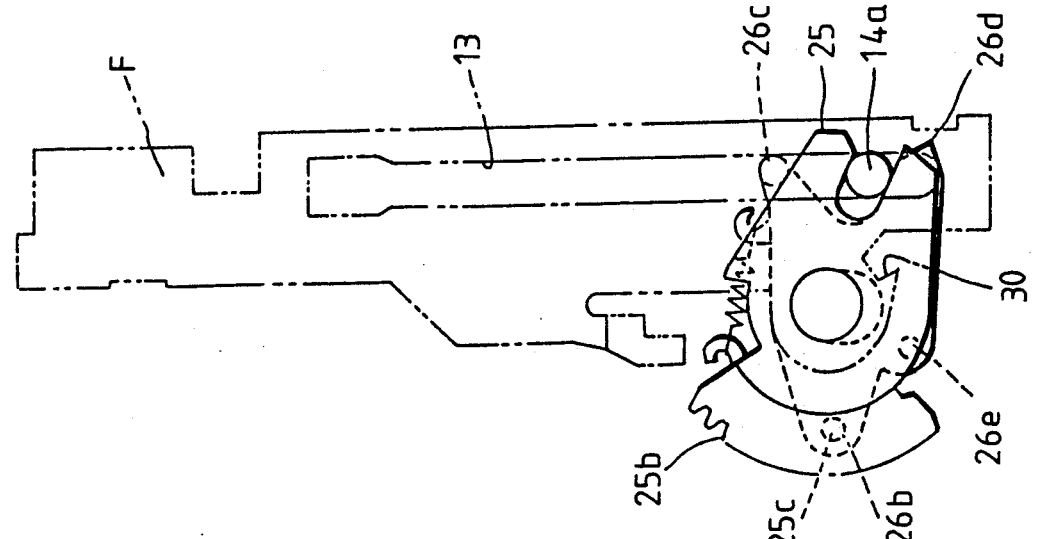
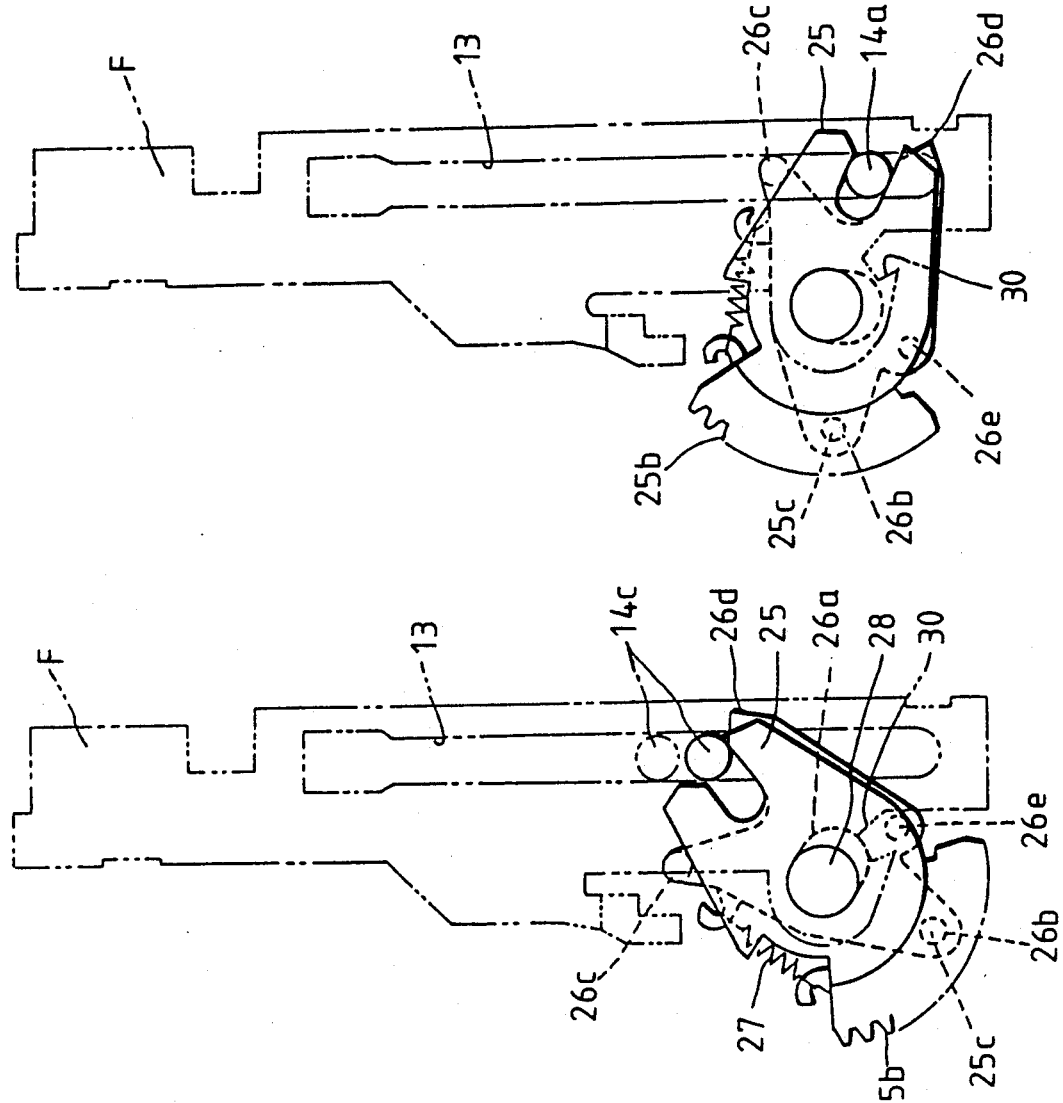
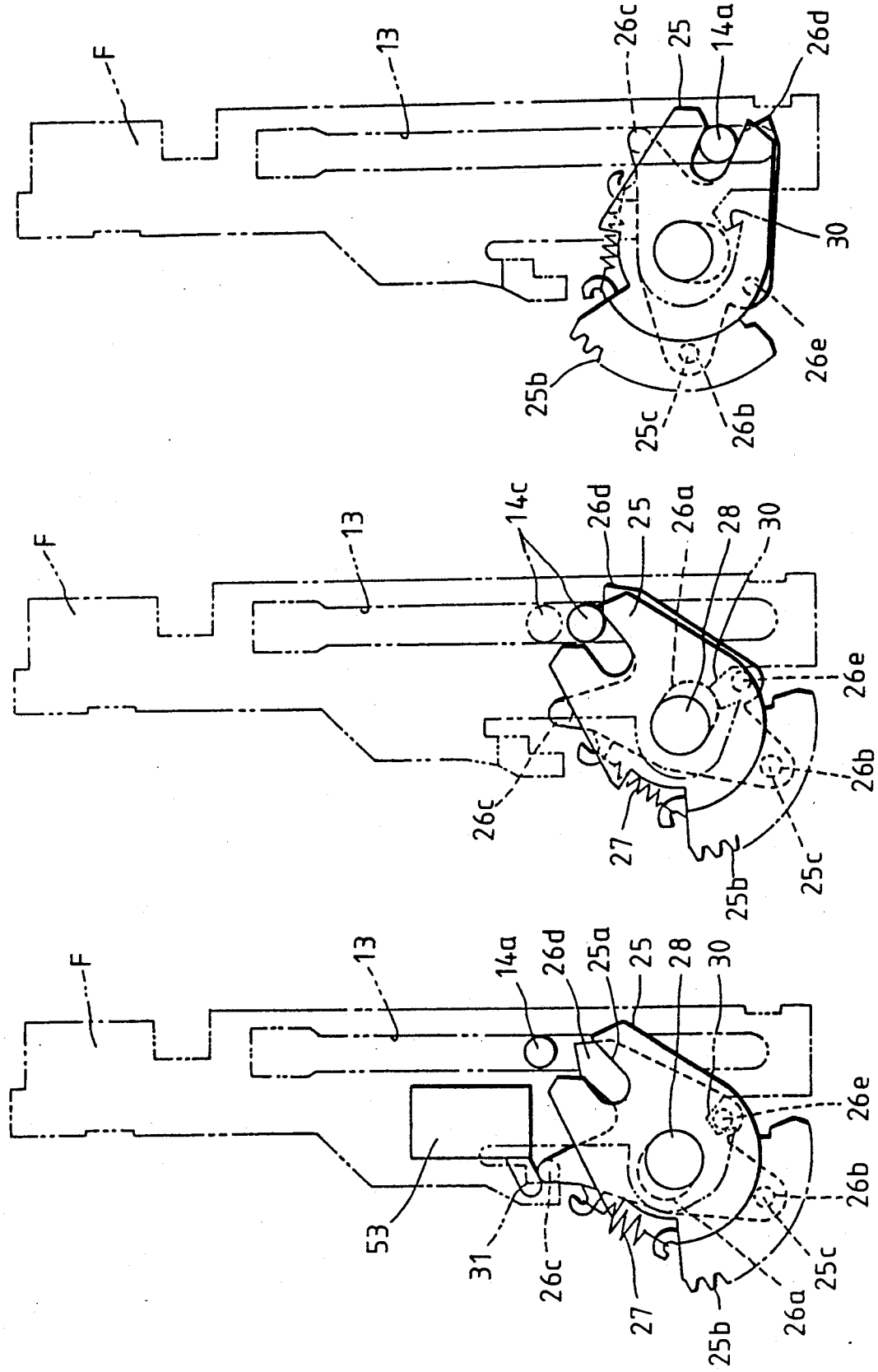

TAPE CASSETTE PUSH-OUT DEVICE FOR TAPE RECORDER

BACKGROUND OF THE INVENTION

The present invention relates to a tape cassette push-out device for a tape recorder in which the device pushes out a tape cassette toward an insertion opening of the tape recorder after a holder holding the tape cassette is moved from a tape driving position to a position adjacent to the backside of the cassette insertion opening.

In many of the conventional tape recorder loading devices which include a holder for carrying a tape cassette from a cassette insertion opening to a tape drive device, the tape cassette is held by the holder, with part of the tape cassette projecting from the cassette insertion opening for the purpose of facilitating removal of the tape cassette at the time of the ejecting operation.

In another conventional method, push-out means, urged in a direction of pushing-out of the tape cassette, is pushed or urged by the tape cassette against the urging force to a position where locking means for the holder is operated so as to lock the tape cassette to the holder.

In this method, when the movement of the holder to effect the ejecting of the tape cassette is carried out, the above locking means is released, and the tape cassette is pushed out forwardly of the holder by the urging force applied to the push-out means.

In the first-mentioned conventional tape cassette-loading device, it is necessary for the holder to be moved backwardly an extra distance corresponding to the amount the tape cassette projects from the cassette insertion opening. Therefore, the depth of the tape recorder is correspondingly increased, and such a tape recorder is not suited for use in a vehicle, in which case the tape recorder is mounted on an automobile dashboard or the like.

The second-mentioned conventional loading device has a drawback in that, since the tape cassette is pushed by the urging force of the push-out means at the time of the ejecting, the tape cassette is abruptly urged forwardly immediately after the lock for the is released. Thus, the cassette jumps forwardly from the tape recorder.

SUMMARY OF THE INVENTION

An object of the invention is to overcome the above problems of the loading devices of conventional tape recorders. More specifically, it is an object of the invention to provide a tape cassette pushout device for a tape recorder in which the amount of movement of the tape cassette in the direction of the depth of the tape recorder is small to thereby reduce the depth of the tape recorder. Thus, the tape recorder can be of a size suitable for use in a vehicle, and the tape cassette will not jump forwardly during ejection from the tape recorder.

The invention provides a tape cassette push-out device for a tape recorder which achieves the above object. In particular, a push-out means is operated to push a rear face of the tape cassette to move the tape cassette to a cassette insertion opening after the completion of the operation of an ejecting means which first moves a holder from a tape driving position of the tape cassette to a position adjacent the cassette insertion opening. Further, the push-out means is retractable from the rear face of the tape cassette after the pushing-out operation.

BRIEF DESCRIPTION OF THE DRAWINGS

FIG. 5 is a side-elevational view showing a tape cassette-introducing portion before the tape cassette is inserted;

FIG. 6 is a side-elevational view similar to FIG. 5, but showing the condition in which a loading operation is taking place;

FIG. 12 /is a plan view showing a rack mechanism in an inoperative condition;

FIG. 13 is a plan view similar to FIG. 12, but showing the condition in which the threading operation is completed;

FIG. 14 is a plan view similar to FIG. 13, but showing the condition in which the tape cassette push-out mechanism is being operated;

FIG. 18 is a plan view showing a threader gear in its inoperative condition;

FIG. 19 is a plan view similar to FIG. 18 but showing the condition in which the threading operation is started;

FIG. 20 is a plan view similar to FIG. 19, but showing the condition in which the operation is completed;

DETAILED DESCRIPTION OF THE PREFERRED EMBODIMENT

Figure 1:
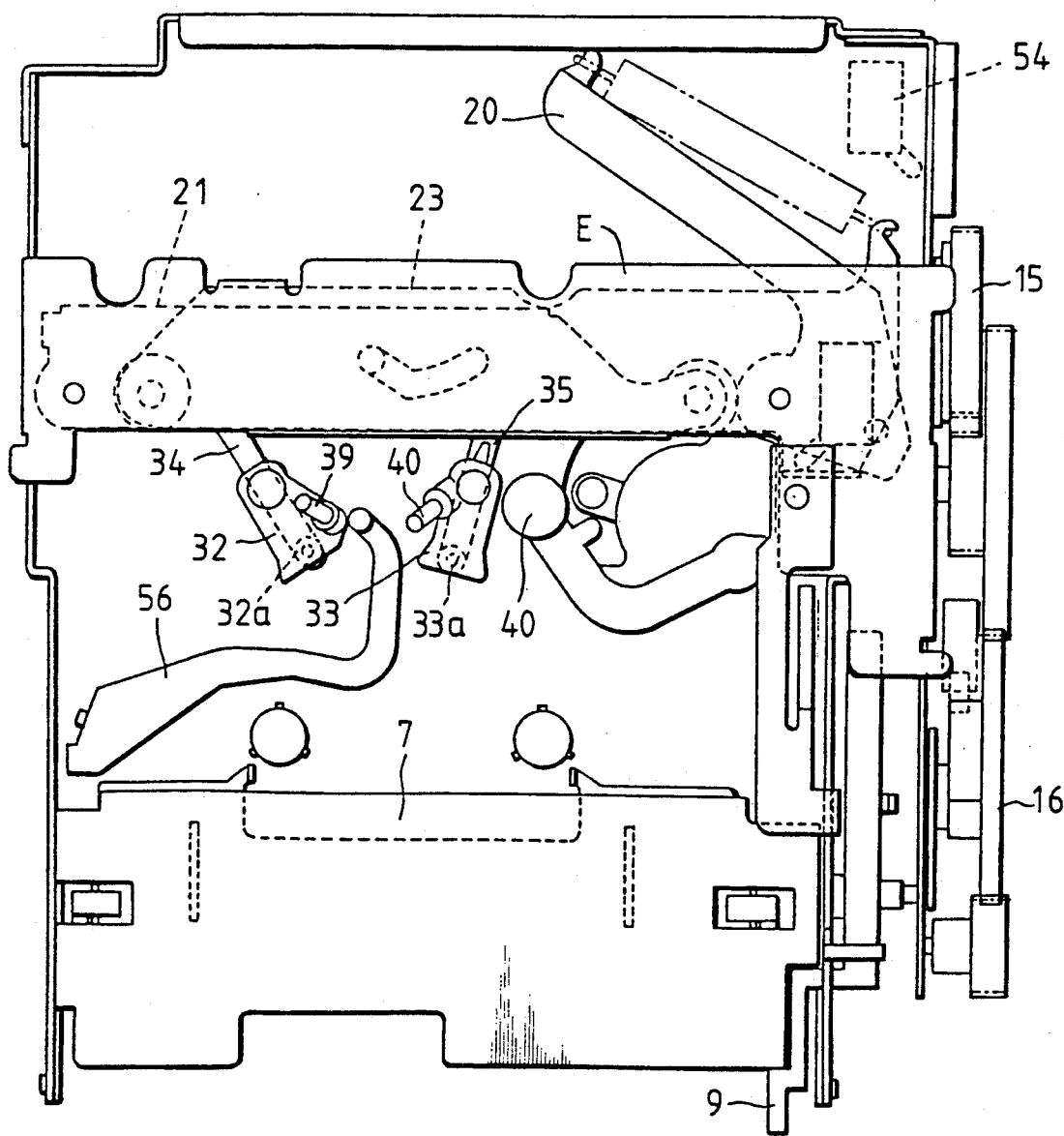
FIG. 1 is a plan view of a preferred embodiment of the present invention.

A preferred embodiment of the invention will now be described with a digital audio tape recorder shown in the drawings.

Referring to FIGS. 4 to 7 a front panel 1 has an insertion opening 2 for inserting a tape cassette A. A door 4 is hingedly mounted by a hinge 3 disposed on the backside of, and below the insertion opening 2. A spring 5 is mounted on the door 4 to urge or bias the same to close the insertion opening 2.

A chassis B is fixedly secured to the backside of the front panel 1. Three guide grooves 6a, 6b an 6c of an inverted L-shape are formed through the chassis B in parallel relation to one another. Horizontal portions of these guide grooves are downwardly stepped as at 6a1, 6b1 and 6c1 to provide lower horizontal sections disposed close to the front panel 1. A cassette box 7 (FIG. 1) for receiving the tape cassette A inserted through the insertion opening 2 has pins 8a, 8b and 8c thereon which are slidably received in the guide grooves 6a, 6b and 6c, respectively. Therefore, the cassette box 7 is movable in accordance with the shapes of the guide grooves 6a, 6b and 6c.

Therefore, when the cassette box 7 is moved along the horizontal portions of the guide grooves 6a, 6b and 6c toward the front panel 1, the cassette box 7 moves downwardly at the stepped portions 6a1, 6b1 and 6c1. When the cassette box 7 reaches the front ends of the guide grooves, it is disposed adjacent to the backside of the insertion opening 2. An arm 9 is pivotally connected to the outer surface of the chassis B by a pin 9c, the arm 9 having a cam surface 9a for contact with the pin 8b and also having a hook portion 9b for pushing a pin 4a of the door 4. A spring 10 for urging the cam surface 9a downwardly is mounted on the outer surface of the chassis B.

Referring to FIG. 2 and FIGS. 12 to 14, a motor 11 is provided for loading and threading purposes, and the rotation of the motor is transmitted to a gear 12 through a belt and gear mechanism.

The gear 12 is in mesh with a rack 14 having a pin 14a slidably received in a guide groove 13 through the chassis B so that the rack 14 is linearly movable.

The rack 14 has an engaging groove 14b, urging walls 14c and 14d disposed on opposite sides of the engaging groove 14b, and rotation-preventing surfaces 14e and 14f extending from the engaging groove 14b.

Referring to FIG. 1 and FIGS. 15 to 17, a gear 15 is rotatably mounted on the chassis B. The gear 15 has a long pin 15a which is engageable in the engaging groove 14b for being angularly moved The long pin 15a cooperates with the rotation-preventing surface 14e to prevent the gear 15 from rotating in a direction of an arrow C (FIG. 15) and also cooperates with the rotation-preventing surface 14f to prevent the gear 15 from rotating in a direction opposite to the direction of the arrow C.

The gear 15 has a short pin 15b which is adapted to be urged by the urging wall 14d, disposed on one side of the engaging groove 14b, so as to rotate the gear 15 in the direction of the arrow C. The gear 15 also has a short pin 15c which is adapted to be urged by the urging wall 14c, disposed on the other side of the engaging groove 14b so as to rotate the gear 15 in the direction opposite to the direction of the arrow C.

As shown in FIG. 1, the gear 15 is connected to a gear 16 via a gear mechanism incorporating a conventional buffer mechanism operable when the gear 15 is rotated in one direction.

As shown in FIG. 5, the pin 8b of the cassette box 7 is received in a slot 17a formed through an arm 17 which is movable together with the gear 16. The rotation of the gear 16 causes the cassette box 7 to move along the guide grooves 6a, 6b and 6c.

Figure 4:
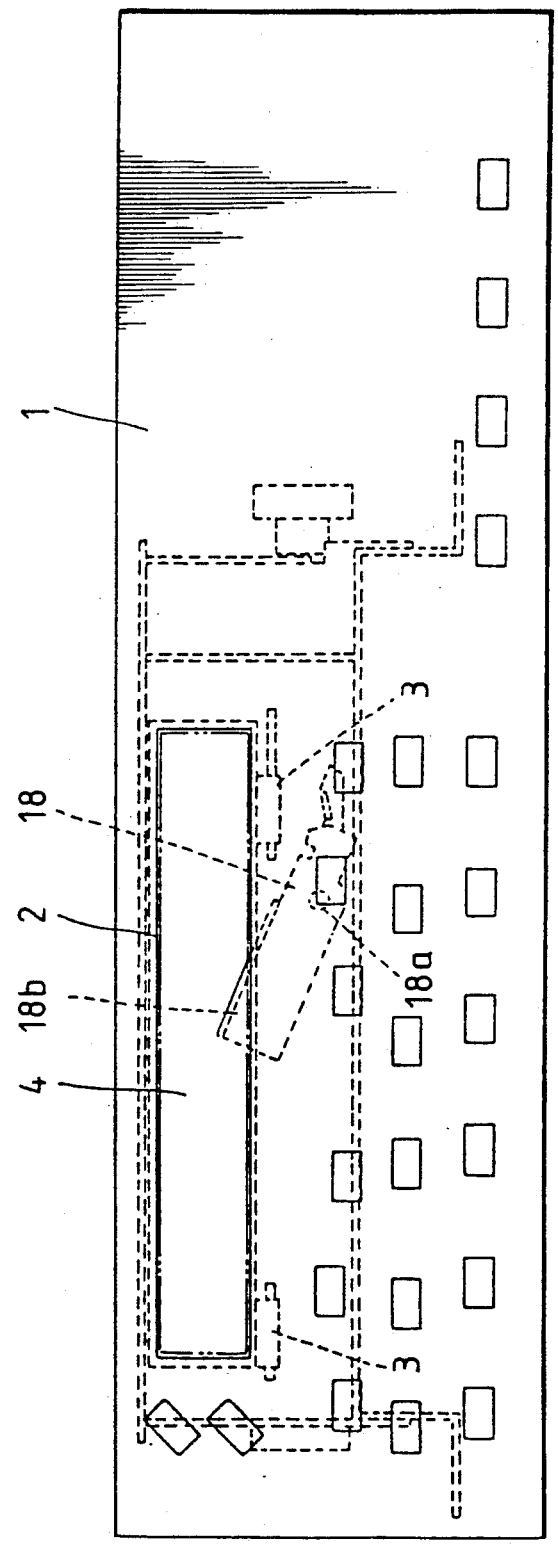
FIG. 4 is a front elevational view.
Figure 7:
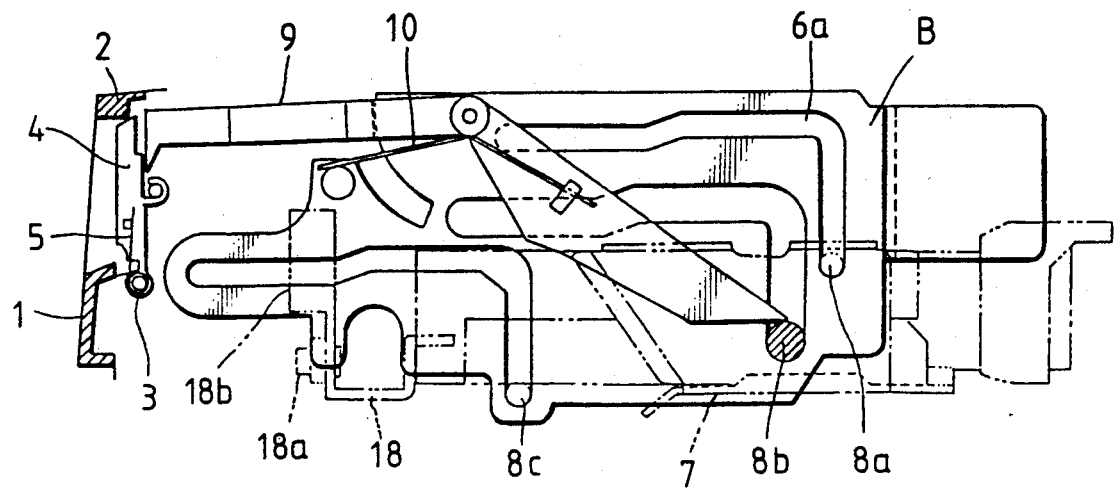
FIG. 7 is a side-elevational view similar to FIG. 6, but showing the condition in which the loading operation is completed, and showing the parts positioned in a threading position.
Figure 8:
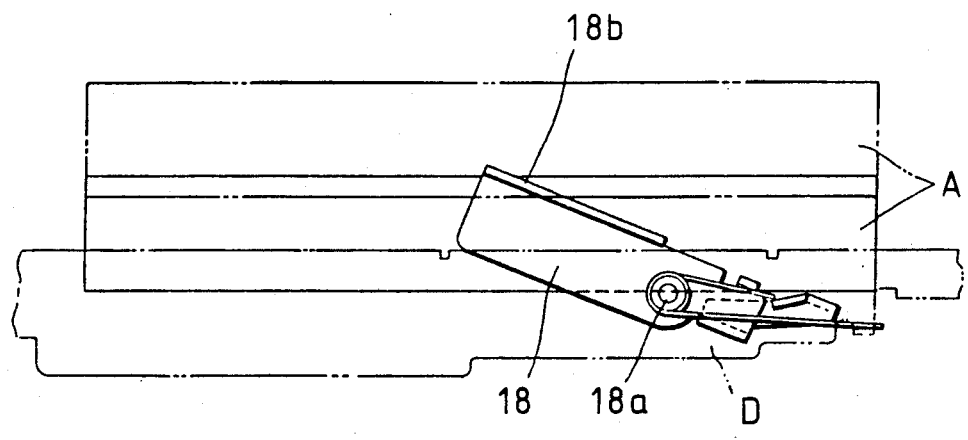
FIG. 8 is a front-elevational view showing a pivotal arm for preventing a double-insertion of cassette tapes.
Figure 9:
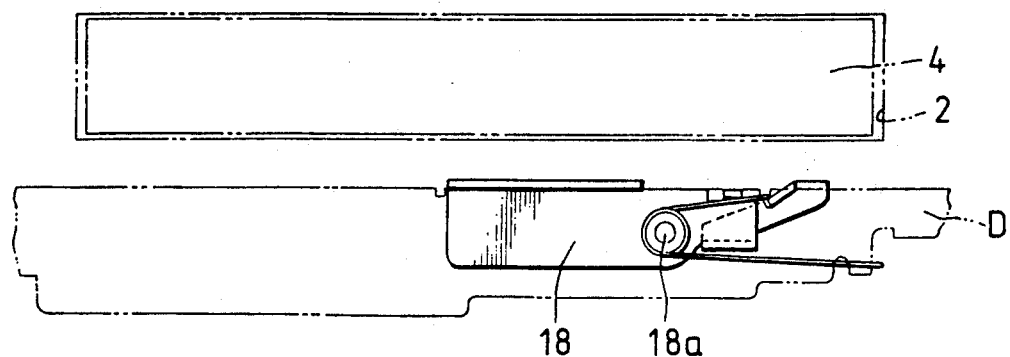
FIG. 9 is a front-elevational view similar to FIG. 8, but showing the pivotal arm in its lowered position.

In FIGS. 4 and 7, a pivotal arm 18 is pressed down at one end by the tape cassette A inserted in the cassette box 7 when the cassette box 7, moving along the vertical portions of the guide grooves 6a, 6b and 6c, comes near the ends thereof.

The pivotal arm 18 is pivotally connected to a frame D by a shaft 18a, and when the pivotal arm 18 is pressed down at the one end by the cassette tape A to be angularly moved, its prevention portion 18b at the other end thereof is moved upwardly on the backside of the insertion hole 2, as shown in FIG. 4.

Figure 3:
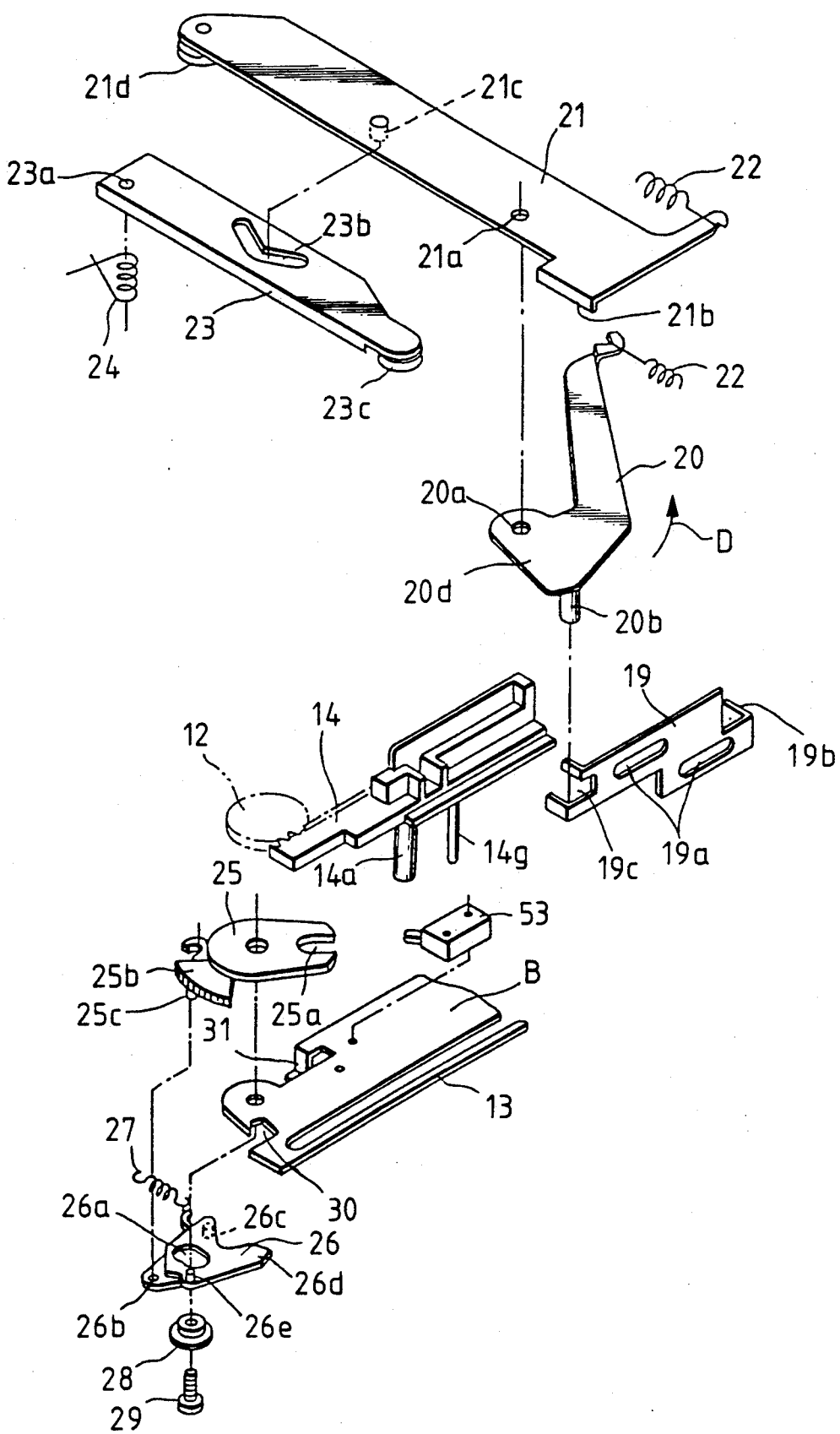
FIG. 3 is a perspective view of an important portion.
Figure 10:
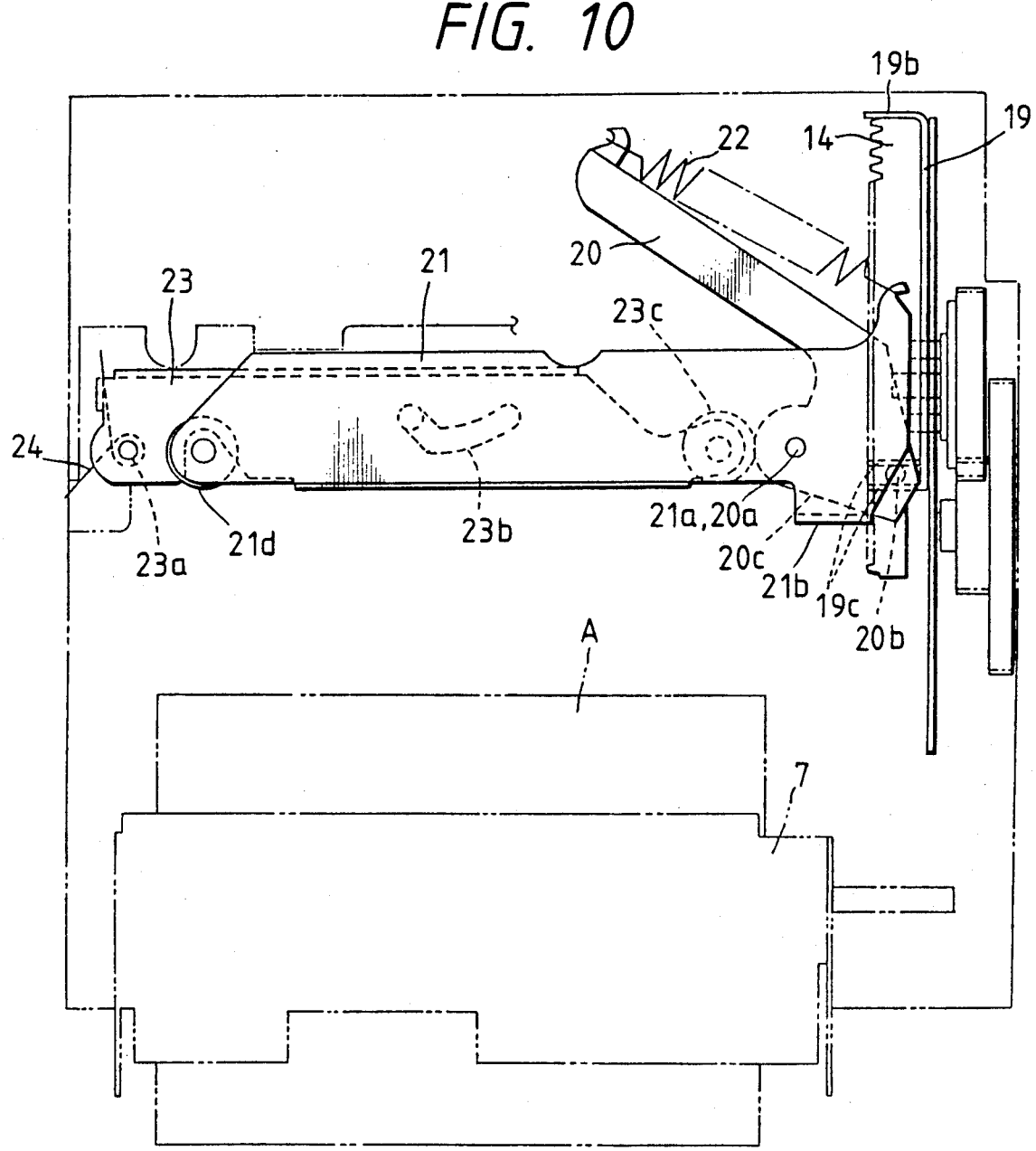
FIG. 10 is a plan view showing a tape cassette push-out mechanism.
Figure 11:
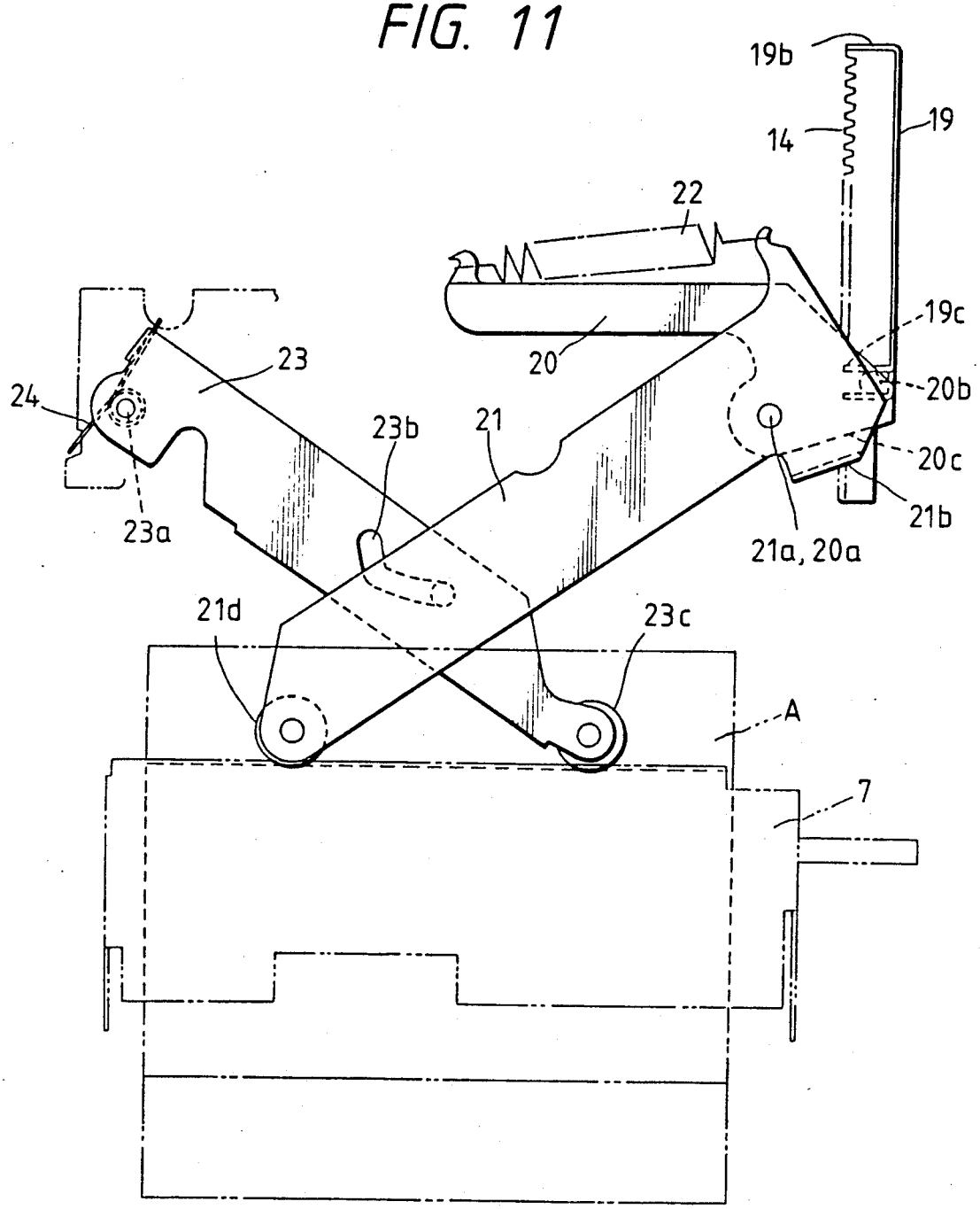
FIG. 11 is a plan view similar to FIG. 10, but showing its operation.

In FIGS. 3, 10 and 11, a slide member 19 has guide grooves 19a which are guided by the chassis B. The slide member 19 has a bent portion 19b which is urged by the rack 14 when the rack 14 is moved to the end of its stroke (which is shown at the uppermost end in FIG. 10), the slide member 19 also having a holder portion 19c.

A pin 20b of a pivotal arm 20 is received in the holder portion 19c of the slide member 19, the pivotal arm 20 being pivotally mounted on a frame E (FIG. 1) through an aperture 20a formed therethrough. When the slide member 19 is urged by the rack 14 to slide, the pivotal arm 20 is also pivotally moved.

An aperture 21a of a first urging arm 21 is in alignment with the aperture 20a of the pivotal arm 20, and is pivotally mounted through the aperture 20a. A spring 22 acts between the pivotal arm 20 and the first urging arm 21.

One side 20c of the pivotal arm 20 is urged against a bent portion 21b of the first urging arm 21 under the influence of the spring 22 to keep a relative position between the pivotal arm 20 and the first urging arm 21.

Therefore, when the pivotal arm 20 is angularly moved in a direction of an arrow D (FIG. 3), the first urging arm 21 is moved together therewith through the spring 22. However, when the angular movement of the first urging arm 21 is prevented, only the pivotal arm 20 is angularly moved, with the spring 22 extended, so that the one side 20c moves away from the bent portion 21b, thus releasing this unisonous movement.

A second urging arm 23 is pivotally mounted on the frame E through an aperture 23a formed through the arm 23. A pin 21c of the first urging arm 21 is received in a generally V-shaped groove 23b formed through the second urging arm 23, and the second urging arm 23 is angularly moved in response to the angular movement of the first urging arm 21.

Urging rollers 21d and 23c are mounted on the ends of the first and second urging arms 21 and 23, respectively and when the pivotal arm 20 is angularly moved by the rack 14, the rollers 21d and 23c are moved toward the cassette box 7.

A spring 24 serves to return the second urging arm 23, and when the second urging arm 23 is returned by the spring 24, the first urging arm 21 and the pivotal arm 20 are also returned in response to the returning of the second urging arm 23.

In FIGS. 3 and 18 to 20, a threader gear 25 is rotatably mounted on a stepped washer 28 connected to a chassis F by a screw 29, the threader gear 25 having a groove 25a for receiving the pin 14a of the rack 14, and gear portion 25b of a fan-shape.

A pivotal retainer member 26 has a pivotal slot 26a through which the washer 28 passes, the pivotal retainer member 26 having an aperture 26b in which a pin 25c of the threader gear 25 is received. The pivotal retainer member 26 having an aperture 26b in which a pin 25c of the threader gear 25 is received. The pivotal retainer member 26 is pivotal about the pin 25c to an extent allowed by the pivotal slot 26a.

A spring 27 acts between the threader gear 25 and the pivotal retainer member 26, and urges the pivotal slot 26a in one direction relative to the stepped washer 28.

The pivotal retainer member 26 has a pin 26e which is received in a notch 30 in the chassis B when the pivotal retainer member 26 is urged by the spring 27 in the above manner, thereby preventing the pivotal retainer member 26 from angular or pivotal movement, so that the threader gear 25 is also prevented by the pin 25c from angular movement.

The pivotal retainer movement 26 has a projecting portion 26d extending to the guide groove 13, and when the projecting portion 26d is urged by the pin 14a, the pivotal retainer member 26 is pivotally moved against the bias of the spring 27 in such a manner that the pivotal slot 26a is moved in the opposite direction relative to the stepped washer 28.

As a result, the pin 26e is disengaged from the notch 30, so that the pivotal retainer member 26 can be pivotally moved, which also enables the pivotal movement of the threader gear 25.

The pivotal retainer member 26 also has a pin 26c, and when the pin 26e of the pivotal retainer member 26 is engaged in the notch 30 under the influence of the spring 27, the pin 26c is held against a retaining portion 31 of the chassis F to thereby limit the direction of rotation of the pivotal retainer member 26.

Figure 2:
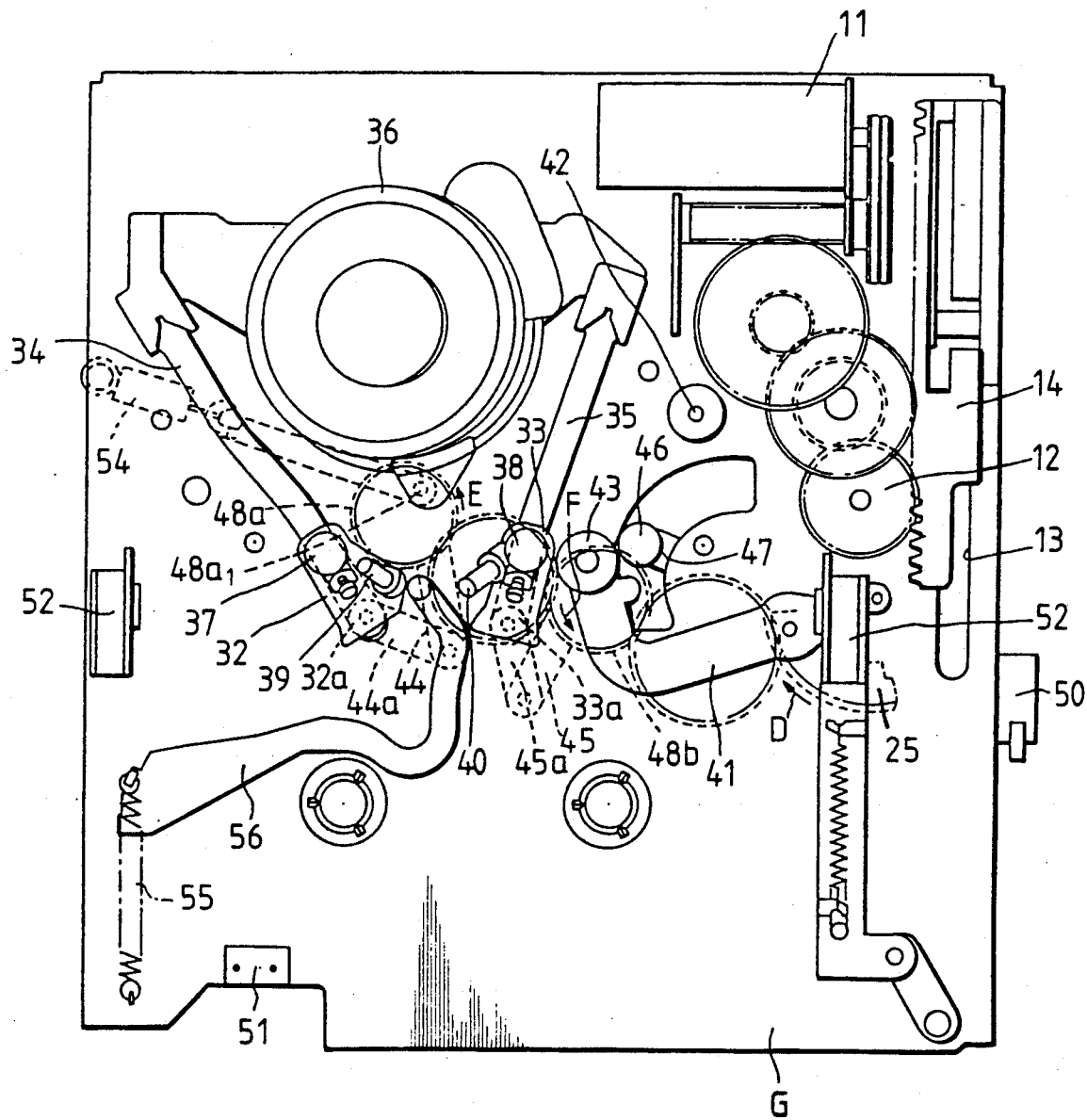
FIG. 2 is a plan view with a cassette box and urging arms omitted from FIG. 1.

In FIG. 2, slide blocks 32 and 33 are slidable along guide grooves 34 and 35, respectively, which are formed through a chassis G. The slide blocks 32 and 33 have on their lower surface respective pins 32a and 33a which are received in the guide grooves 34 and 35, respectively. The slide blocks 32 and 33 have on their upper surfaces respective guide rollers 37 and 38 for drawing the tape from the tape cassette A and winding it on a cylinder head 36. The slide blocks 32 and 33 also have on their upper surfaces respective guide pins 39 and 40 for extending the tape obliquely relative to the cylinder head 36.

The lengths of the guide grooves 34 and 35 are so determined that when the slide blocks 32 and 33 are disposed in their initial positions before drawing the tape from the tape cassette A, the pin 33a of the slide block 33 is abutted against the end of the guide groove 35 while the pin 32a of the slide block 32 is not abutted against the end of the guide groove 34. This arrangement is intended to positively abut the slide block 33 relative to the guide groove 35 and to prevent the slide block 32 from abutting against the guide groove 34 due to dimensional irregularities.

A pinch roller 43 is mounted on an arm 41 and cooperates with a capstan 42 to hold the tape therebetween so as to drive the tape.

A series of gears 48 are drivingly connected to the gear portion 25b of the threader gear 25, and an arm 44 is fixedly connected to one gear 48a of these gears. The arm 44 and the slide block 32 are connected together by a link 44.

An arm 45 is fixedly connected to another gear 48b of the gears 48, and the arm 45 and the slide block 33 are connected together by a link 45a.

Therefore, when the threader gear 25 rotates in the direction of the arrow D. the series of gears 48 are rotated together with the arms 44 and 45, so that the arms 44 and 45 urge the respective links 44a and 45a. As a result, the slide blocks 32 and 33 are moved along the respective guide grooves 34 and 35 to draw the tape from the cassette A to wind the same on the cylinder head 36.

The gear 48a has a pin 48a1, and a spring 54 extends between the pin 48a1 and the chassis G in such a manner that the spring 54 passes by a dead point during the sliding movement of the slide block.

Figure 21:
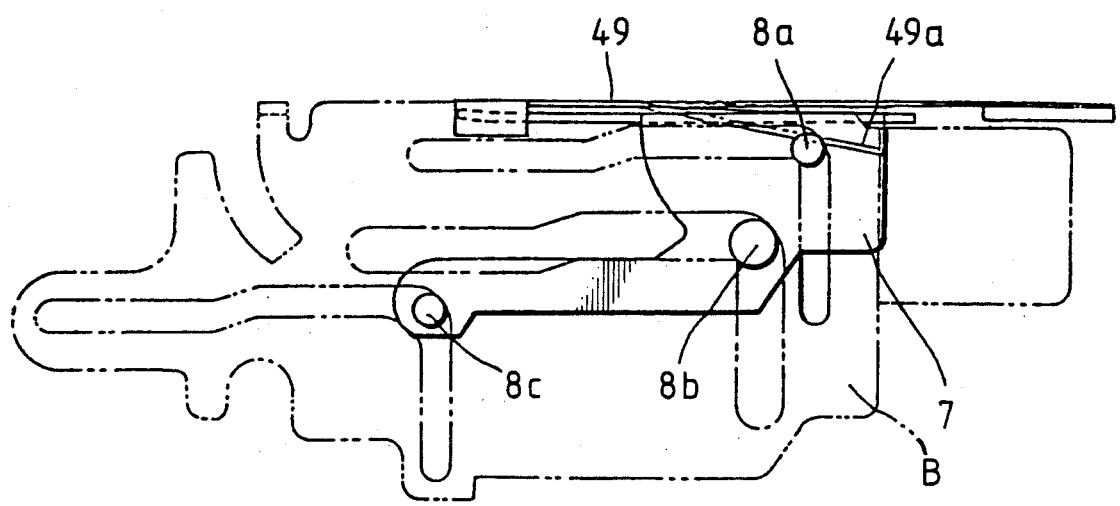
FIG. 21 is a side-elevational view showing the operation of a spring plate.
Figure 22:
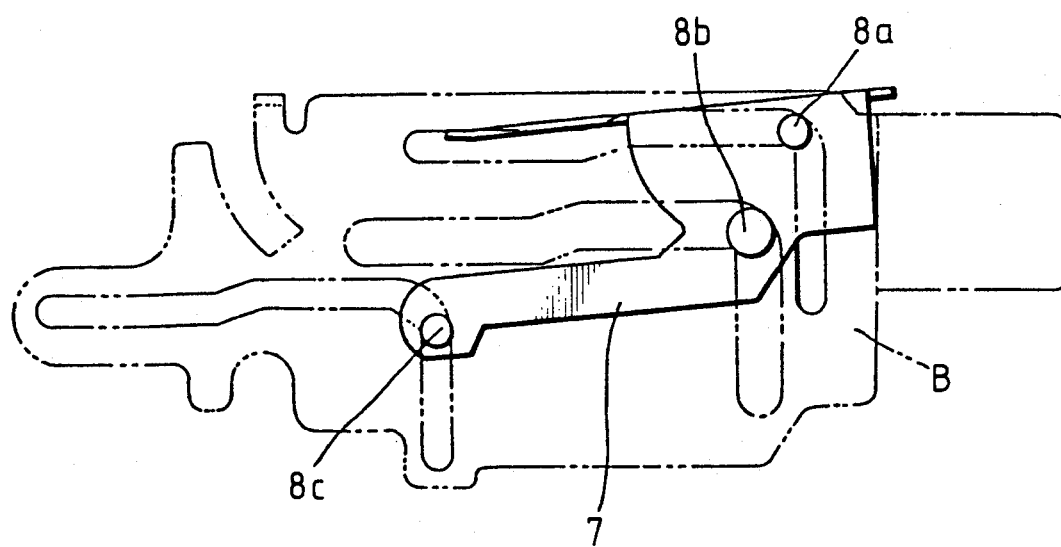
FIG. 22 is a side-elevational view showing the condition in which the cassette box is unable to operate because of lack of the spring plate.

In FIGS. 21 and 22, a spring plate 49 has a depressive portion 49a which presses down the rear end of the cassette box 7 when the pins 8a, 8b and 8c of the cassette box 7 reach the corners of the guide grooves 6a, 6b and 6c, respectively.

The operation of the above digital audio tape recorder will now be described.

As shown in FIG. 5, the guide pins 8a, 8b and 8c of the cassette box 7 in the respective guide grooves 6a, 6b and 6c are disposed in their standby positions close to the door 4.

In this condition, the tape cassette is pushed into the cassette box 7 through the insertion opening 2 of the front panel 1, with the door 4 opened into a flat condition.

At this time, due to this pushing operation, the gear 16 is slightly angularly moved, operating the buffer mechanism incorporated in the gear train from the gear 15 to the gear 16 but the gear 15 does not move angularly.

When the gear 16 is thus slightly moved angularly a switch 50 (FIG. 2) is turned on.

When the switch 50 is turned on, the motor 11 is rotated to drive the gear 12, so that the rack 14 slides downwardly (FIG. 12).

Figure 15:
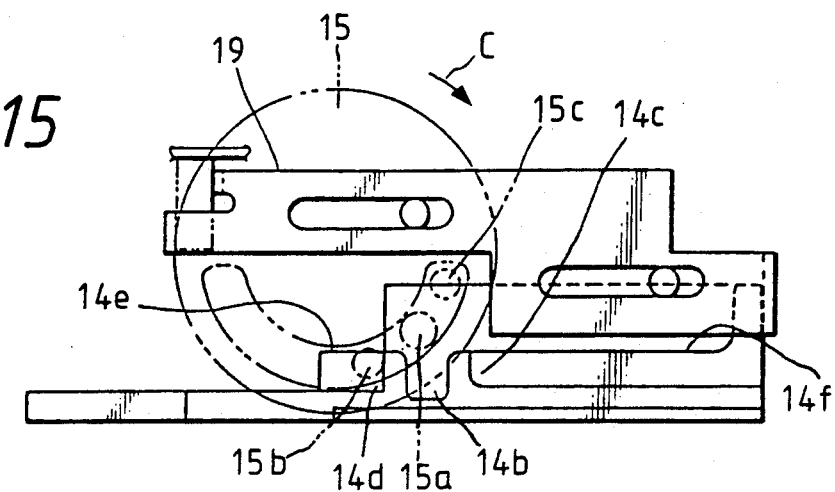
FIG. 15 is a side-elevational view of FIG. 12.
Figure 16:
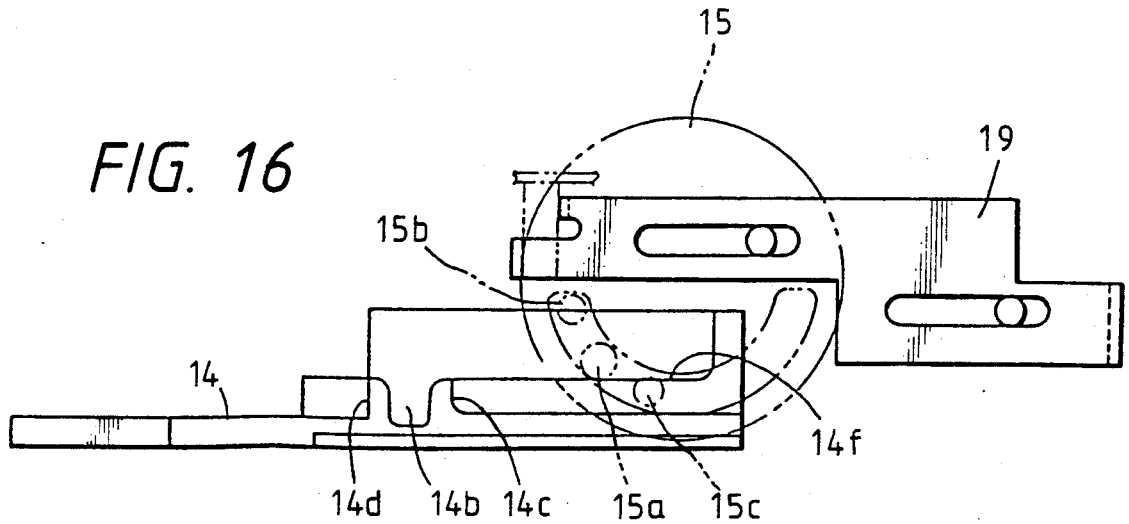
FIG. 16 is a side-elevational view of FIG. 13.

The relative position between the rack 14 and the gear 15 at the time of effecting the starting operation is shown in FIGS. 12 and 15.

Then, the rack 14 slides in a left-hand direction (FIG. 15). so that the urging wall 14d urges the short pin 15b of the gear 15 to rotate the gear 15.

As a result of the rotation of the gear 15 the long pin 15a is engaged in the engaging groove 14b, and the gear 15 continues to rotate through this engagement, but finally the long pin 15a is disengaged from the engaging grooves 14b after the gear 15 rotates through a certain angle.

At this time, however since the long pin 15a is brought into contact with the rotation-preventing surface 14f to prevent the rotation of the gear 15, the angle of rotation of the gear 15 is kept at a predetermined angle, thereby holding the gear 15 from displacing relative to this angular position.

The rotation of the gear 15 causes the gear 16 to rotate, and the arm 17, moving together with gear 16, causes the pin 8b to move from the position shown in FIG. 5 to the position shown in FIG. 7. As a result, the cassette box 7 is moved from the position of insertion of the tape cassette A to a threading position where the tape is drawn from the tape cassette A.

During this time, the cassette box 7 is moved upwardly to a position or level higher than the position of insertion of the tape cassette A since the guide grooves 6a, 6b and 6c have the respective stepped portions 6a1, 6b1 and 6c1. The higher position and the threading position can be preselected for setting the tape cassette A.

Thus, the insertion opening 2 can be at a level lower than this higher position, and therefore if the height or level of the tape recorder for an automobile or the like is limited, a reasonable upper margin of the front panel 1 above the insertion opening 2 can be secured for the sake of the appearance.

The pin 8b contacts the cam surface 9a during its horizontal movement to angularly move the arm 9 against the bias of the spring 10, as shown in FIG. 6.

The angular movement of the arm 9 causes the hook portion 9b to urge the pin 4a of the door 4 in its opening direction. Upon further movement of the pin 8b, the pin 8b is disengaged from the cam surface 9a, so that the door 4 is returned to its closed position under the influence of the spring 10 to thereby prevent dust and the like from intruding through the door 4.

The arm 9 for opening and closing the door 4 is necessary because if the door 4 is kept closed, the ejection of the tape cassette A cannot be effected.

If the front end portion of the cassette box 7 close to the door 4 is inclined downwardly due to vibration or the like as shown in FIG. 22 when the cassette 7 reaches the corners of the guide grooves 6a, 6b and 6c during the loading operation, the pin 8c cannot move in a horizontal direction, and the pin 8a cannot move vertically.

Therefore, the cassette box 7 cannot be moved further.

However, the depressive portion 49a of the spring plate 49 presses down the rear portion of the cassette box 7 to hold the cassette box 7 horizontally when the cassette box 7 reaches the corners of the guide grooves. Therefore, the above situation where the cassette box 7 is prevented from moving further is not encountered.

Thus, the cassette box 7 is moved vertically downwardly to open the lid and to effect other operations, so that the cassette box 7 is set in the threading position.

The tape cassette A, when set in a threading position, presses a switch 51 to turn it on.

Also, when the tape cassette A is set in the threading position, two tape end sensors 52 (FIG. 2) for detecting the ends of the tape in the cassette case A initiate their operations.

However, even if a foreign object is inserted through the insertion opening 2 and presses the cassette box 7, or if the cassette case A is inserted backwards to press the cassette box 7, the above loading operation is effected, so that the cassette box 7 is moved to the threading position.

In the event of the insertion of a foreign object or the reverse loading of a cassette case, the pressing of the switch 51 or the operation of the tape end sensors 52 is not effected properly.

If either of the above two situations occurs at the threading position, the motor 11 immediately rotates in a reverse direction to effect an ejection of the cassette box 7 which is a reverse operation of the loading operation.

When the tape cassette A is set in the threading position, the one end of the pivotal arm 18 is depressed by the tape cassette A, so that the pivotal arm 18 is angularly moved, with its prevention portion 18b raised and disposed on the backside of door 4, thereby preventing the insertion of another tape cassette A.

The prevention portion 18b may be so arranged as to be raised and disposed immediately adjacent to the backside of the door 4 so as to prevent the door 4 from being opened.

The rotation of the gear 15 is stopped, and the long pin 15a is prevented by the rotation-preventing surface 14f from angular movement. Simultaneously with this, the setting of the tape cassette A at the threading position is completed, but the rack 14 continues to move, and its pin 14a pushes the projecting portion 26d of the pivotal retainer member 26.

When the projecting portion 26d is thus pushed, the pivotal retainer member 26 is angularly moved about the aperture 26b, so that the pin 26e is disengaged from the notch 30 to thereby allow the rotation of the pivotal retainer member 26.

Therefore the threader gear 25 is also allowed to rotate, and the pin 14a is received in the groove 25a of the threader gear 25 as a result of the above rotation of the pivotal retainer member 26.

Then, the pin 14a urges the threader gear 25 and the pivotal retainer member 26 to rotate in accordance with the movement of the rack 14, and this rotation is transmitted through the fan-shaped gear portion 25b to the series of gears 48.

When the pivotal retainer member 26 is thus moved, the pin 26c is disengaged from the retaining portion 31. At this time, the pin 26c operates a switch 53, thereby detecting the arrival of the cassette box 7 at the threading position and also the initiation of the threading.

Upon rotation of the series of gears 48, the arms 44 and 45 rotate to urge the links 44a and 45a, respectively, to move the slide blocks 32 and 33. As a result, the guide rollers 37 and 38 of the slide blocks 32 and 33 draw the tape from the tape cassette A, and the guide pins 39 and 40 wind the tape on the cylinder head 36.

At this time, the spring 54 passes by the dead point as a result of the rotation of the gear 48a, and therefore again produces an urging force to pull the pin 48a1 so that the spring 54 holds the slide block 32 against movement and also holds the slide block 33 against movement through the gear 48b.

In response to this movement, the arm 41 also moves angularly to bring the pinch roller 43 into contact with the capstan 42 so as to drive the tape for running thereby completing the threading operation.

The operation from the completion of the threading to the ejecting will now be described.

In accordance with an external ejecting instruction, the motor 11 begins to rotate in a reverse direction, so that the rack 14 also begins to return in a reverse direction.

As a result, the threader gear 25 and the pivotal retainer member 26 are rotated in their reverse directions, so that the slide blocks 32 and 33 and the pinch roller 43 are returned to their initial positions through the series of gears 48, and the tape wound on the cylinder head 36 is again wound on the tape cassette A.

The spring 54 again passes by the dead point as a result of the rotation of the gear 48a and pulls the pin 48a1 to urge the gear 48a in a direction of an arrow E.

This urging or biasing force is transmitted to the slide block 32 through the arm 44 and the link 44a to urge the slide block 32 toward the rear end of the guide groove 34. At this time, however, the pin 32a is not abutted against the rear end of the guide groove 34.

Therefore, the slide block 32 may rattle slightly, but it is held in place without rattling since a tension arm 56 biased by a spring 55 is held against the slide block 32.

The urging force to urge the gear 48a in the direction of the arrow E also urges the gear 48b in a direction of an arrow F.

Therefore, this urging force is transmitted to the slide block 33 through the arm 45 and the link 45a, so that the pin 33a of the slide block 33 is abutted against the rear end of the guide groove 35 as shown in FIG. 2. Therefore, the slide block 33 is held at its rear position without rattling.

Hence, the next time the tape cassette A arrives at the threading position, the guide rollers 37 and 38 and the guide pins 39 and 40 are positioned on the backside of the tape. Thus, they do not interfere with the tape and do not bend or damage it.

Further, the spring 54 urges the threader gear 25 in a direction opposite to the direction of the arrow D, so that the pin 26c of the pivotal retainer member 26 is pressed against the retaining portion 31 of the chassis F to thereby maintain the pivotal retainer member 26 and the threader gear 25 at their initial positions.

When the pin 14a is disengaged from the groove 25a of the threader gear 25 as a result of the rotation of the threader gear 25 in its reverse direction as described above, the pivotal retainer member 26 is angularly moved under the influence of the spring 27, and the pin 26e is engaged in the notch 30 to prevent the pivotal retainer member 26 and the threader gear 26 from rotating.

At the same time, since the pin 26c is urged against the retaining portion 31, the pivotal retainer member 26 is held in position against movement, so that the switch 53 can be turned on in a stable manner.

Figure 17:
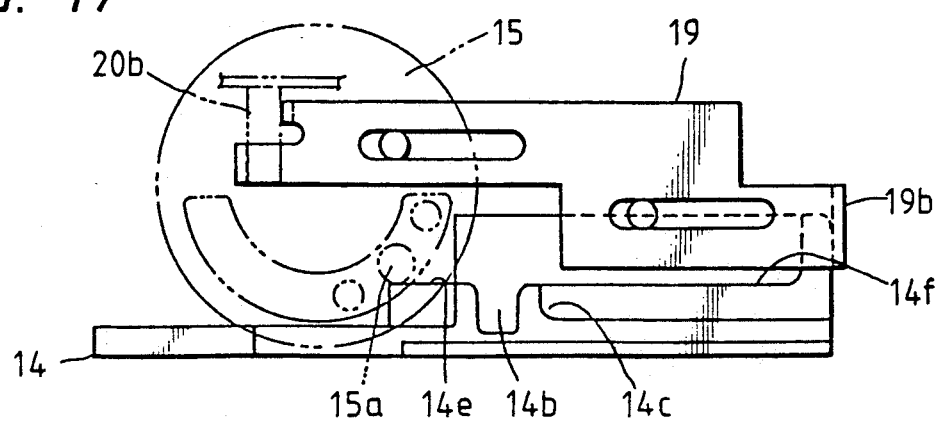
FIG. 17 is a side-elevational view of FIG. 14.

Then, the urging wall 14c of the rack 14 urges the short pin 15c to rotate the gear 15, so that the long pin 15a is engaged in the engaging groove 14b to continue the rotation of the gear 15. Finally, the long pin 15a is disengaged from the engaging groove 14b as shown in FIG. 17 to thereby stop the rotation of the gear 15.

During the above operation, the cassette box 7 is moved in manner reverse to the loading operation because of the reverse rotation of the gear 16, so that the cassette box 7 reaches the position where it is disposed adjacent to the backside of the insertion opening 2, with the tape cassette A placed on the door 4.

Thereafter, the rack 14 continues to retract, and the long pin 15a is brought into engagement with the rotation-preventing surface 14e to prevent a further rotation of the gear 15.

Because of the retraction of the rack 14, the bent portion 19b of the slide member 19 is urged by the rack 14 to slide rearwardly.

When the slide member 19 is thus moved rearwardly, the pin 20b is urged by the holder portion 19c of the slide member 19, so that the pivotal arm 20 is angularly moved. As a result, the first urging arm 21 is angularly moved through the spring 22 to displace its urging roller 21d forwardly.

At the same time, the first urging arm 21 angularly moves the second urging arm 23 to displace the urging roller 23c forwardly, so that the urging rollers 21d and 23c push the tape cassette received in the cassette box 7, thereby enabling the removal of the tape cassette (FIG. 11).

When the above operation caused by the retraction of the rack 14 is completed, the pin 14g of the rack 14 pushes a switch 54 (FIG. 1) to again rotate the motor 11 in its normal direction, and the motor 11 is stopped when the first and second urging arms 21 and 23 are returned to their positions shown in FIG. 1.

If the urging rollers 21d and 23c cannot be displaced, the first and second urging arms 21 and 23 are not angularly moved, with the spring 22 extended, even when the pivotal arm 20 is angularly moved, thereby positively preventing damage and malfunction of the parts.

As described above, in the present invention, even after the holder carries the tape cassette from the threading position to the cassette insertion opening, the motor continues to rotate, and the rack continues to retract to operate the push-out means.

The push-out means pushes the rear face of the tape cassette to move it forwardly of the holder, so that the tape cassette is projected or extended from the cassette insertion opening, thus facilitating the removal of the tape cassette.

After the above operation, the push-out means is returned to its initial position as a result of the reverse movement of the rack, and is disposed at a position rearwardly of the rear face of the tape cassette to be inserted. Therefore, the tape cassette can be inserted deep into the holder.

This arrangement obviates the need for a stroke required for retracting the tape cassette from the cassette insertion opening, and therefore the retracting stroke of the holder can be reduced. Hence, the depth of the tape recorder can be reduced, and the tape recorder can be suitably mounted on a dashboard.

The push-out means does not impart an abrupt large stroke of movement to the tape cassette as in a spring-bias arrangement, and therefore the tape cassette will not jump forwardly from the tape recorder.

What is claimed is:

1. A tape cassette push-out device for a tape recorder comprising:
    a holder for holding a tape cassette inserted through a cassette insertion opening;
    ejecting means for moving said holder from a position of driving of a tape of the tape cassette to a position adjacent said cassette insertion opening; and
    a push-out means operable after completion of the operation of said ejecting means so as to push a rear face of the tape cassette to move the tape cassette toward said cassette insertion opening, said push-out means being retractable from the rear face of the tape cassette after pushing out the cassette,
    wherein said push-out means comprises first and second urging arms pivotally mounted on a frame portion of the tape recorder, said first urging arm having a pin projecting from an intermediate portion thereof, and said second urging arm having a groove formed therethrough for receiving said pin such that said second urging arm is angularly moved in response to angular movement of said first urging arm,
    wherein said push-out means further comprises a pivotal arm pivotally mounted on said frame portion and connected to said first urging arm by a resilient means.

2. A tape cassette push-out device for a tape recorder according to claim 1, further wherein each of said first and second urging arms has an urging roller mounted on an end thereof for pushing the tape cassette during operation of said push-out means.

3. A tape cassette push-out device for a tape recorder according to claim 1, further wherein said groove in said second urging arm is V-shaped.

4. A tape cassette push-out device for a tape recorder according to claim 1, further wherein said resilient means is a spring.

5. A tape cassette push-out device for a tape recorder according to claim 1, further wherein said pivotal arm is connected to a drive means.

* * * * *